(No Model.)
LAFAYETTE WILKERSON.
SEED PLANTER.
No. 264,012. Patented Sept. 5, 1882.
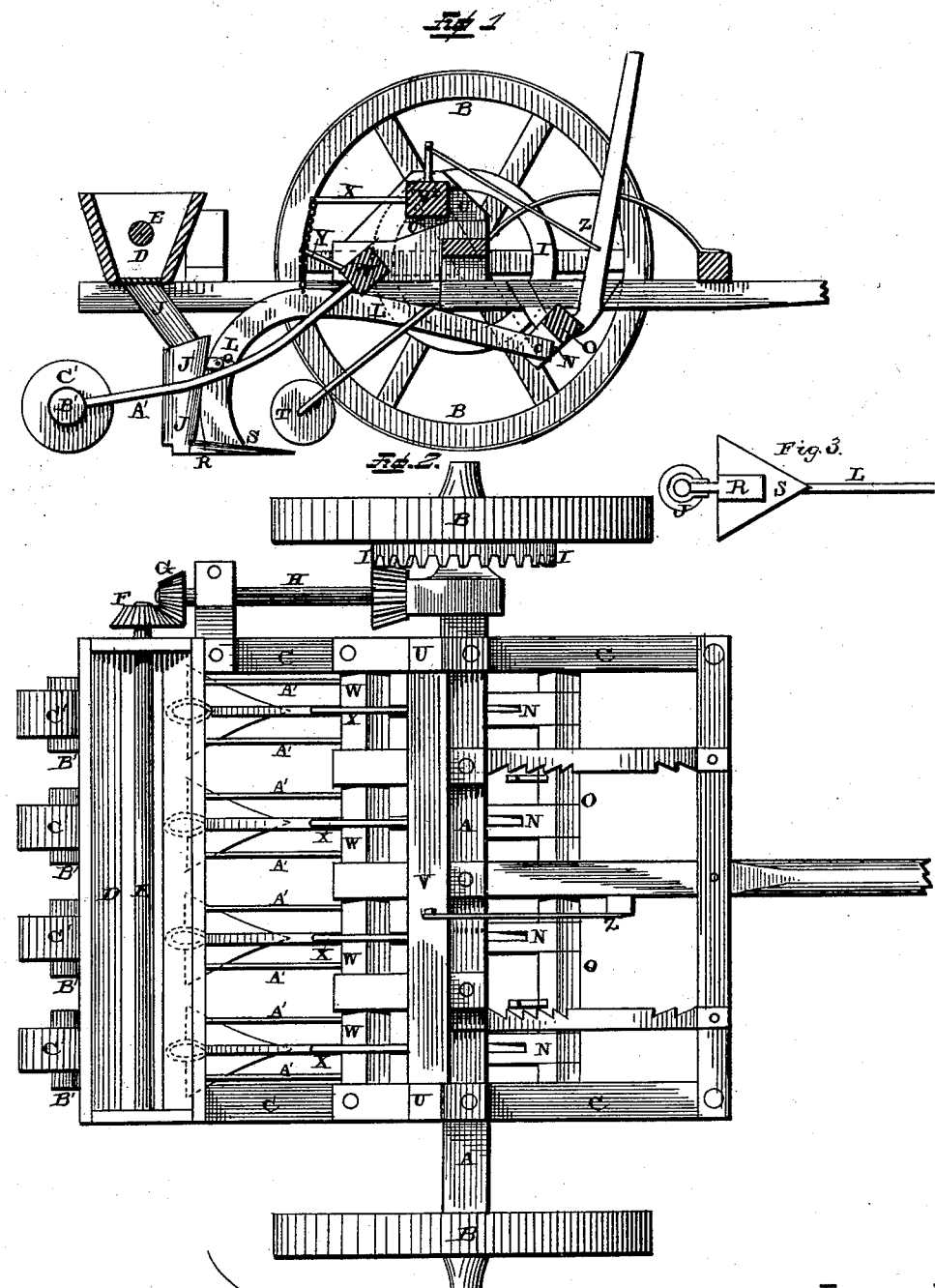

UNITED STATES PATENT OFFICE.

LAFAYETTE WILKERSON, OF SCIPIO, INDIANA.

SEED-PLANTER.

SPECIFICATION forming part of Letters Patent No. 264,012, dated September 5, 1882.

Application filed May 29, 1882. (No model.)

*To all whom it may concern:*

Be it known that I, LAFAYETTE WILKERSON, of Scipio, in the county of Jennings and State of Indiana, have invented certain new and useful Improvements in Seed-Planters; and I do hereby declare the following to be a full, clear, and exact description of the invention, such as will enable others skilled in the art to which it pertains to make and use it, reference being had to the accompanying drawings, which form part of this specification.

My invention relates to an improvement in seed-planters; and it consists in the combination of the drills or furrow-openers with rollers which run behind the drills for the purpose of pressing back the sod or earth upon the seed, the drills and the rollers being fastened to pivoted blocks upon different parts of the frame, so that the drills can be moved independently of the rollers, or both be moved together, as will be more fully described hereinafter.

The object of my invention is to provide a seeder which is specially adapted for seeding worn-out pastures and meadows without having to break up the sod, and which will deposit the seed under the sod and leave the ground practically as it was in the first place.

Figure 1 is a vertical section of my invention complete. Fig. 2 is a plan view of the same. Figs. 3 and 4 are detail views.

A represents the axle; B, the driving-wheels, and C the frame, which is secured to the under side of the axle. Upon the rear end of this frame is placed the seed-box D, which has the shaft E running through it, and which shaft has a pinion, F, upon one end. With this pinion F another pinion, G, engages, which is to be placed upon the rear end of the shaft H, which is made to revolve by means of the teeth I, secured to the inner side of one of the drive-wheels. The seed passes from the seed-box down through the tubes J, which are attached to or formed with the beams L, which are pivoted at their front ends to the arms N, which project outward from the shafts O, which are journaled in the front end of the frame. These tubes, when made separate from the beams, are provided with ears Q near their upper end, which catch upon opposite sides of the beam, while their lower ends are supported in position upon the shoes R, which extend out from underneath the hoes or drills S, formed on the lower ends of the beams. These shoes are wider on the under side of the hoes or drills than they are at their rear ends, which are so shaped as to catch in a notch which is formed in the lower front edge of the tubes. By this construction the tubes are held rigidly in place by a single bolt or other device, which passes through the two ears and the sides of the beam. Secured to each one of the beams is a rolling colter, T. These hoes or drills are made flat, as is here shown, and the front edge of the beam is made sharp, so that the hoes will run along underneath the sod without turning it over or injuring it in any manner. The seed passes down through the tubes and is deposited in the track of the furrow-opener underneath the sod.

Upon the top of the frame are secured the bearings U, in which are journaled the operating-shaft V and the two outer ones of a series of short shafts, W.

To the shaft V, which extends across the top of the frame, are secured a number of arms, X, which have chains fastened to their rear ends, which chains are fastened first to the arms Y, which extend outward from the short shafts W, and then the chains have their lower ends fastened to the tops of the beams L. The shaft V is operated by means of the lever and connecting-rod Z. Also, fastened to each one of the short shafts W are the two metallic rods A', which are slightly curved, and have their rear ends secured or fastened in any suitable way to the short shafts B', which pass through the rollers C', which run behind the drills or furrow-openers. These arms are long enough to allow the rollers to run behind the furrow-openers as the machine is drawn along for the purpose of pressing back the earth or sod which has been loosened by the furrow-openers or drills. As these roller-arms are connected to the short shafts W, together with the arms to which the chains are attached, it will readily be seen that when the shaft V is turned by means of the lever Z the chains will be made to raise both the beams and the rollers at the same time.

The beams can be operated independently of the rollers by means of the short shafts to which the front ends of the beams are attached; but the rollers can only be moved at the same time that the drills are raised upward. While the lever Z serves only to lift the rollers and drills upward, the other levers serve to regulate the depth at which the drill shall run. This independent adjustment is gained by having the front ends of the beams attached to shafts of their own, and attaching the rollers to the short shafts W independently of the beams.

Having thus described my invention, I claim—

1. The combination of the beams, pivoted at their front ends to short shafts, which will raise or depress the front ends of the beams, with the short shafts W and the shafts V, the connecting-chains, and the arms or levers connected to the shafts, and the operating-lever Z, whereby the depth at which the furrow-openers or drills shall run is regulated, substantially as shown.

2. The combination of the beams, pivoted at their front ends, the shaft V, short shafts W, arms or levers, and connecting-chains, with the rollers, which are connected to the short shafts W by suitable arms, substantially as described.

3. The combination of the beams, the seed-tubes provided with ears near their upper ends, and having their lower ends supported upon a shoe, R, which extends from the rear of the furrow-opener, substantially as set forth.

In testimony whereof I affix my signature in presence of two witnesses.

LAFAYETTE WILKERSON.

Witnesses:
GEO. W. GETZENDAUER,
W. S. PRATHER.